United States Patent [19]

Hoffmann

[11] Patent Number: 4,884,180
[45] Date of Patent: Nov. 28, 1989

[54] REGULATED DIRECT-CURRENT CONVERTER

[75] Inventor: Günther Hoffmann, Eningen, Fed. Rep. of Germany

[73] Assignee: Wandel & Goltermann GmbH & Co., Eningen, Fed. Rep. of Germany

[21] Appl. No.: 273,965

[22] Filed: Nov. 18, 1988

[30] Foreign Application Priority Data

Dec. 8, 1987 [DE] Fed. Rep. of Germany ....... 3741452

[51] Int. Cl.$^4$ .......................................... H02M 3/335
[52] U.S. Cl. ...................................... 363/21; 363/26; 363/97; 363/101
[58] Field of Search ................ 363/17, 21, 26, 37, 363/44, 45, 101, 97, 24

[56] References Cited

U.S. PATENT DOCUMENTS

| | | | |
|---|---|---|---|
| 4,017,785 | 4/1977 | Perper | 363/37 |
| 4,322,817 | 3/1982 | Kuster | 363/26 |
| 4,642,745 | 2/1987 | Steigerwald et al. | 363/37 |

FOREIGN PATENT DOCUMENTS 122825 10/1977 Japan .
0748719 7/1980 U.S.S.R. ............................... 363/17
2152771 8/1985 United Kingdom .

OTHER PUBLICATIONS

Schaltnetzteile, Wim Hetterscheid et al., Kontakt & Studium, J.Wustehube, Eigenschaften und Arbeitsprinzipien von Schaltnetzteilen, pp. 24–29 (plus 3 pg.), 4/84.
IBM Technical Disclosure Bulletin, vol. 18, No. 1, pp. 150,151; Jun. 1975, W.Krumrein, International Business Machines Corp. Armonk.

Primary Examiner—Patrick R. Salce
Assistant Examiner—Kristine Peckman
Attorney, Agent, or Firm—Herbert Dubno

[57] ABSTRACT

A dc converter for supplying an electronic device in which a feed voltage is summed with an additional voltage generated by rectification and wherein pulse-width control is provided at the primary side of the converter transformer. According to the invention, the additional voltage is generated by rectification in the same manner as the main output voltage is generated, i.e. the rectifier circuit outputting the additional voltage is similar to that outputting the output voltage.

23 Claims, 3 Drawing Sheets

REGULATED DIRECT-CURRENT CONVERTER

FIELD OF THE INVENTION

My present invention relates to a direct-current converter and, more particularly to a direct-current converter serving as a current supply source for an electronic device or unit and which sums a supply voltage and a further voltage which is generated by the converter itself by rectification to form a main output voltage. More particularly, the invention relates to a dc converter of this type with pulse-width control.

BACKGROUND OF THE INVENTION

A dc converter is described in J. Wüstehube, "Circuit Components", 1982, expert publication/VDE-Publishers, Series Contacts & Studies, Vol. 33, page 26. This converter, utilized to supply electronic and electrical devices, sums a feed voltage supplied to the converter and additive voltages generated by the converter itself by rectification to form a main output voltage in this system, pulse-width control serves to regulate the primary current flowing through a primary winding of a converter transformer through the use of a switching transistor.

The circuit described in this publication is capable of delivering a constant output voltage, especially to sensitive electronic devices, even upon the development of sharply varying feed voltages and feed voltages which are greatly different from one another.

Another advantage of the converter is that it can be set for simultaneously outputting a number of output voltages including a main output voltage which can be regulated to be exactly constant, as well as auxiliary output voltages which can vary to a greater or lesser extent with fluctuations in the feed voltage.

The regulatory range of a converter of this type is in principle wide enough to allow all customary line voltages (for example from 100 volts to 240 volts) to be rectified without switching because of voltage differences, the rectified line voltage being supplied as the feed voltage to the converter input.

In practice, however, the efficiency of the converter and, of course, the constancy of the various auxiliary output voltages will reflect the fluctuations of the input voltage.

With the increased stringency of the voltage supply requirements of more modern electronic devices, this type of dc converter is rapidly becoming unusable and can only be amplified effectively if it is switched off, or provided with additional means for responding to widely varying line voltages which may be applied to the converter.

OBJECTS OF THE INVENTION

It is the principal object of the present invention to provide a converter of the aforedescribed type in which the efficiency and the constancy of the unregulated auxiliary voltage outputted thereby will be satisfactory even in the case of large variations (for example 1:4) of the feed voltage Another object of the invention is to provide a converter, especially for supplying power to electronic devices sensitive to voltage fluctuations, whereby drawbacks of earlier converters provided for this purpose can be obviated.

SUMMARY OF THE INVENTION

These objects and others which will become apparent hereinafter are attained, in accordance with the invention in a direct-current converter for supplying electric current to an electronic device and of the type in which a feed voltage delivered from a line-current source to the converter and an additional voltage generated by the converter by rectification, are summed to form a main output voltage and in which pulse-width control holds a primary current through a primary winding of a converter transformer substantially constant with the aid of a switching transistor.

According to the invention, the additional voltage is generated by rectification in the same way as the main output voltage is formed.

In this manner, the range of variation of the voltage applied to the converter transformer and the rise time or prescient time is shortened so that very small current flow times within which very high current peak variations can develop, are avoided and a substantial improvement in the efficiency of the converter and the constancy of the auxiliary voltage outputted thereby can be observed.

For example, if the variation range and feed voltage (for instance rectified line voltage) is 1:4, the additional voltage which is added thereto is set to be approximately twice the smallest feed voltage which may be implied so that the variation range of the input voltage at the converter transformer is a maximum of 2:1.

Indeed, W. Krumrein, "DC-Converter", in: IBM Technical Disclosure Bulletin, Vol. 18, No. 1, pages 150/151, June 1975, indicates that a dc converter can form the sum of a feed voltage and an auxiliary voltage generated by rectification in a converter. In this single-ended converter, however, the output voltage generating rectifier-circuit functions as a flow-through converter and the rectifier circuit which generates the auxiliary voltage functions as a blocking converter.

The United Kingdom patent document No. 21 52 771A discloses an ac rectifier whose anchoring point capacitor receives the sum of a feed voltage generated for a line voltage rectifier and an auxiliary voltage. The latter is generated in the converter itself and by controlled rectification is varied so that the voltage on the anchoring point capacitor remains constant.

U.S. Pat. No. 4,642,745 describes a regulated line-voltage rectifier with a loosely-coupled auxiliary voltage varying sharply with the frequency in a resonant circuit.

U.S. Pat. No. 4,017,785 describes a supply circuit for lamps in which a line-voltage rectifier and a high-frequency oscillator applied thereby are used. A second rectifier generates auxiliary voltage in series with the strongly fluctuating feed voltage across very small dimensioned load capacitor of the line-voltage rectifier.

With blocking converters, a further improvement in the efficiency can be obtained, in accordance with the invention by providing the primary winding and the secondary winding which yields the additional voltage and is connected to the rectifier circuit for the additional voltage, with the same numbers of turns, and by connecting the end of the primary winding connected to the switching transistor with the end of the secondary coil connected to the rectifier circuit generating the additional voltage by a condenser.

In this manner I am able to recover the energy which is stored in the stray inductivity of the converter transformer from cycle to cycle. In addition, the switching transistor is protected from voltage overloads which might be generated by the stray inductivity at the beginning of a cutoff interval.

It has been found to be especially advantageous to provide the converter as a through-flow converter and so that the additional voltage is generated by rectification of the voltage which is applied to the primary winding. In this manner no special winding is required for generating the additional voltage so that for remaining windings of the transformer, the copper cross section can be increased and the efficiency of the converter improved.

According to the invention, moreover, with a constant regulated output voltage, the feedback additional voltage is decreased when the feed voltage increases. This can be achieved by magnetically coupling the choke coils in the dc output circuits.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
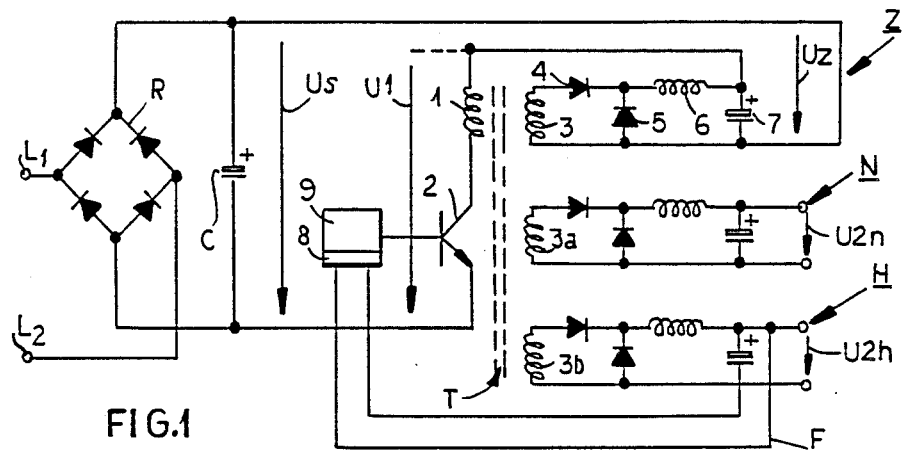
FIG. 1 is a circuit diagram of a single end throughflow converter utilizing a secondary coil for generating the additional voltage.

FIG. 1 shows in a simplified form a single-ended through-flow converter with pulse-width control and which comprises a converter transformer T having a single primary winding 1 and three secondary windings 3, 3a and 3b, respectively.

A switching transistor 2 has its emitter collector network in series with the winding 1 and connected to one output terminal of a rectifier bridge R having input terminals $L_1$ and $L_2$ from a line-current source.

The other side of the coil 1 is connected to an output terminal of a rectifier circuit supplied by the secondary winding 3.

The smoothing condenser C lies across the output terminals of the rectifier bridge R and the output voltage of the rectifier bridge, as measured across the capacitor C has been indicated at Us.

The converter input voltage 3 is designated at U1 and is applied through the emitter-collector network of transistor 2 to the primary winding 1 of the transformer T. This input voltage is an algebraic sum of the feed voltage Us obtained by rectification of the line voltage and additional voltage Uz.

The additional voltage Uz is derived from one of three identical rectifier circuits Z, N, H, respectively, and specifically the rectifier circuit Z.

Each of the rectifier circuits Z, N and H is comprised of a respective secondary coil, for example, the coil 3 previously described or the secondary windings 3a and 3b in the circuits N and H, respectively, a rectifier element 4, for example, a rectifier diode, a free-running diode 5, a chock 6 and a capacitor 7.

The rectifier circuit H, constituted identically to the rectifier circuit Z outputs the main output voltage U2h.

In a feedback loop F, the main output potential U2h is applied via a voltage isolating arrangement 8 to a control unit 9 effecting pulse-width control to maintain constancy of the main output voltage U2h In the case of a deviation from the desired main output voltage in the form of an increased output voltage, the control pulses are shortened in duration and in the case of a main output voltage which is smaller than the set point value, longer control pulses are outputted by the circuit 9.

The rectifier circuit N supplies an auxiliary output voltage U2n.

The additional voltage Uz is about twice the magnitude of the smallest feed voltage Us which may be expected as a consequence, the converter input voltage U1 varies only as much as the feed voltage Us.

Figure 1A:
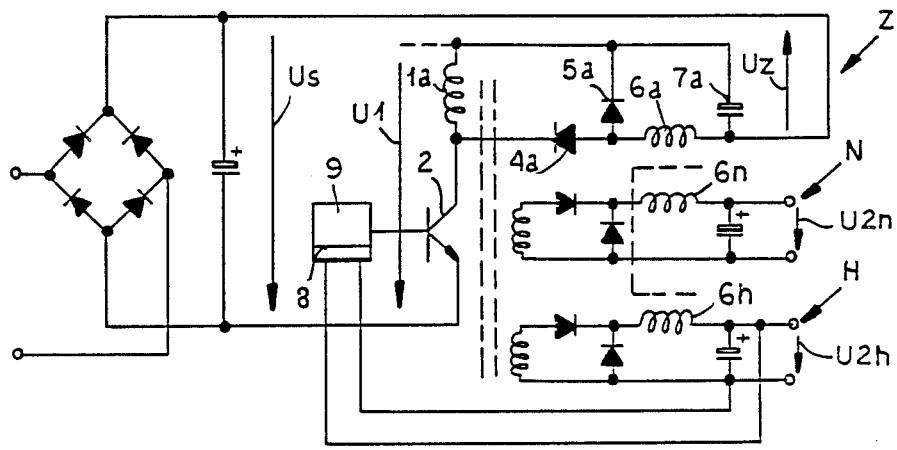
FIG. 1A is a circuit similar to FIG. 1 in which the rectifier for generating the additional voltage is connected to the primary winding.

FIG. 1a shows a circuit which differs from that of FIG. 1 only in that the secondary winding 3 of FIG. 1 is omitted in the rectifier circuit Z generating the additional voltage Uz. In this case, the rectifier circuit Z comprises the rectifier elements 4a and 5a, the choke 6a and the capacitor 7a with, however, the rectifier diode 4a poled oppositely to the rectifier 4 in FIG. 1.

As a consequence the output from the rectifier circuit Z is applied to a different terminal of the primary winding 1a from the terminal the winding 1 to which the output of the rectifier circuit Z in FIG. 1 is connected the choke 6a is also connected to the opposite terminal of the capacitor 7a from that to which the choke 6 is connected to the capacitor 7 in FIG. 1. However, the same conditions and operation effects apply, i.e. the additional voltage Uz is approximately twice the smallest expected feed voltage Us.

Figure 2:
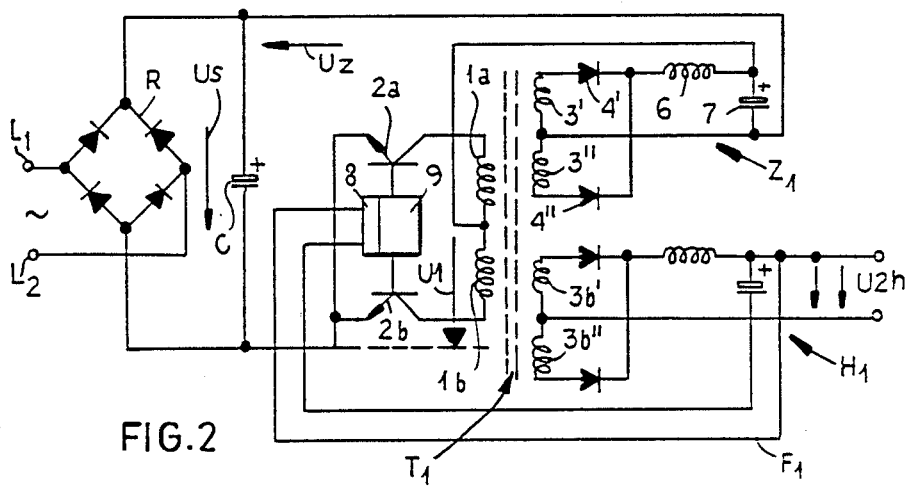
FIG. 2 is a circuit diagram of a push-pull throughflow converter with a push-pull secondary winding for generating the additional voltage.

FIG. 2 shows a push-pull circuit which otherwise utilizes principles similar to those of FIG. 1, an auxiliary output rectifier circuit such as that shown at N being omitted.

In this circuit, the rectifier bridge R has its terminals $L_1$ and $L_2$ connected to the line-current source and supplied a feed voltage Us across the capacitor C. The two transistors 2a and 2b are provided in push-pull, each in series with one of the primary windings 1a and 1b of the transformer $T_1$. The center tap between the primary windings 1a and 1b is connected to the output terminal of the push-pull rectifier circuit $Z_1$ which has secondary windings 3' and 3" in series with respective rectifier diodes 4', 4", and the choke 6 across the capacitor 7.

The additional voltage Uz is additively combined with the voltage U1 in the manner described.

The main output voltage U2h is here derived from a corresponding push-pull rectifier circuit $H_1$ which has secondary windings 3b', 3b" in series with corresponding rectifier diodes and a choke across a capacitor.

The feed-back circuit $F_1$ is here applied through an isolator 8 to the pulse-width controller 9 which operates the transistors 2a and 2b in push-pull. Otherwise the circuit of FIG. 2 operates in a manner similar to that of FIG. 1, and of course additional rectifier circuits can be provided on the secondary side of the transformer $T_1$ if auxiliary voltages are to e outputted.

Figure 2A:
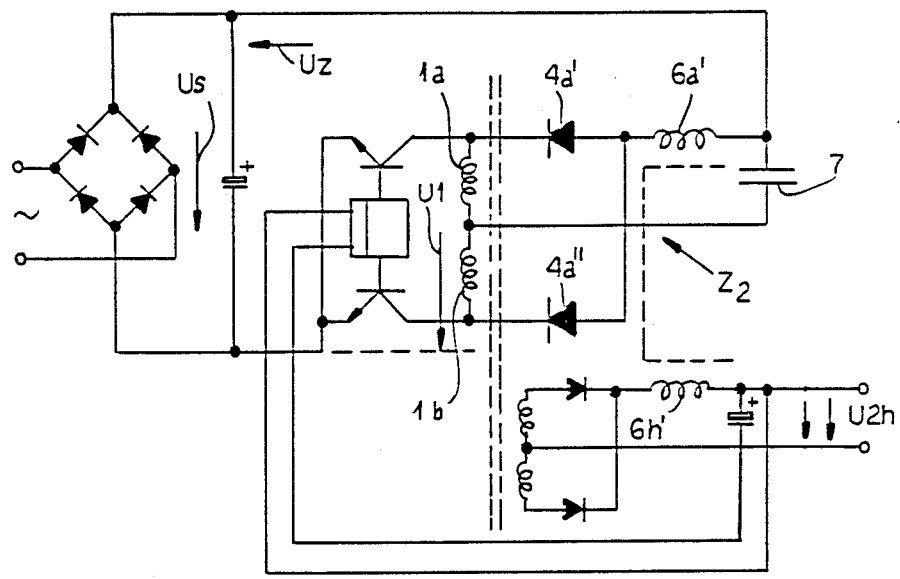
FIG. 2A is a circuit diagram similar to FIG. 2 of a circuit in which the rectifier for generating the additional voltage is connected to the primary winding.

FIG. 2a, of course, represents a push-pull variant similar to that of FIG. 2 but without the secondary windings for the additional voltage as in FIG. 1a.

In this embodiment, therefore, the rectifier circuit $Z_2$ is connected across the primary windings 1a and 1b directly, the rectifiers 4a' and 4a" are oppositely poled with respect to the rectifiers 4' and 4" and the choke 6a" and the capacitor 7 are connected in essentially the same configuration in FIG. 2.

Thus the embodiment of FIG. 2a is essentially the same as that of FIG. 2 with the exception that the push-pull secondary winding of the additional voltage circuit is eliminated and the polarities of the rectifier element of the circuit supplying the additional voltage Uz and, of course, the change in the connections so that the voltages Uz and Us are both applied directly to the push-pull primary windings.

In the embodiments of FIGS. 1a and 2a, the elimination of the secondary windings for the additional voltage Uz permits an increase in the wire cross section of the remaining windings and thereby an overall increase in the efficiency of the circuits.

In all of the embodiments described the voltage constancy, even for auxiliary voltages, can be improved by magnetic coupling of the chokes in the respective rectifier circuits.

Figure 3:
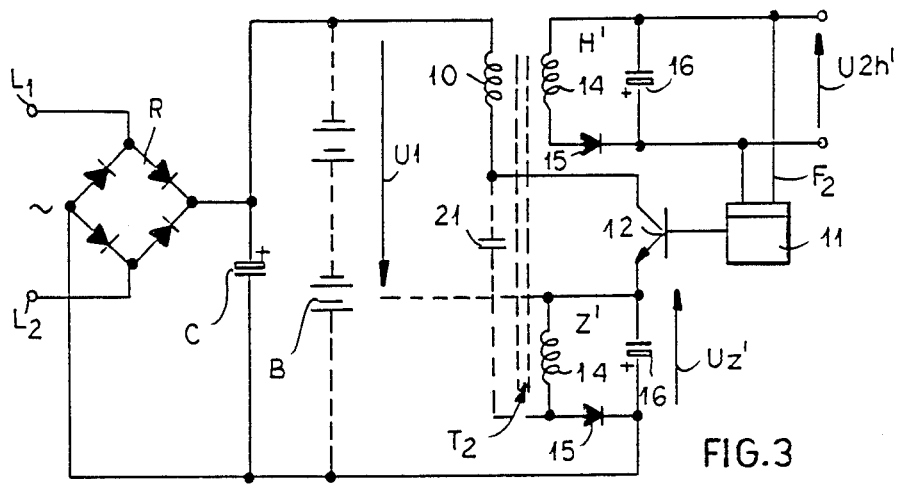
FIG. 3 a diagram of a circuit in accordance with the present invention applied to a single-end blocking converter.

FIG. 3 illustrates a single-ended blocking converter in accordance with the principles of the present invention and in which again a feed voltage is obtained from a rectifier bridge R connected to a line-voltage source at terminals $L_1$ and $L_2$, respectively, and across which a capacitor C is connected. The feed voltage is equivalent to a direct current from a symbolically illustrated battery B.

In this embodiment, the converter transformer $T_2$ has a primary winding 10 in series with the collector-emitter wire of a switching transformer 12 whose base receives an input from the pulse-width controller 11. The converter-input voltage is here represented at U1 and it is additively combined with an additional voltage Uz'. The input voltage U1, of course, is derived form the feed voltage Us.

The additional voltage Uz' is generated by a rectifier circuit Z' on the secondary side of the transformer and including a secondary winding 14, a rectifier 15 and a load condenser 16. A substantially identical rectifier circuit H' with a secondary winding 14, a rectifier 15 and a load condenser 16 outputs the main output voltage U2h'. The latter is applied in a feedback path $F_2$ through an isolator to the pulse width controller 11.

In a similar manner, although not illustrated, additional rectifier circuits can be provided on the secondary side to output auxiliary voltages as may be required.

Figure 4:
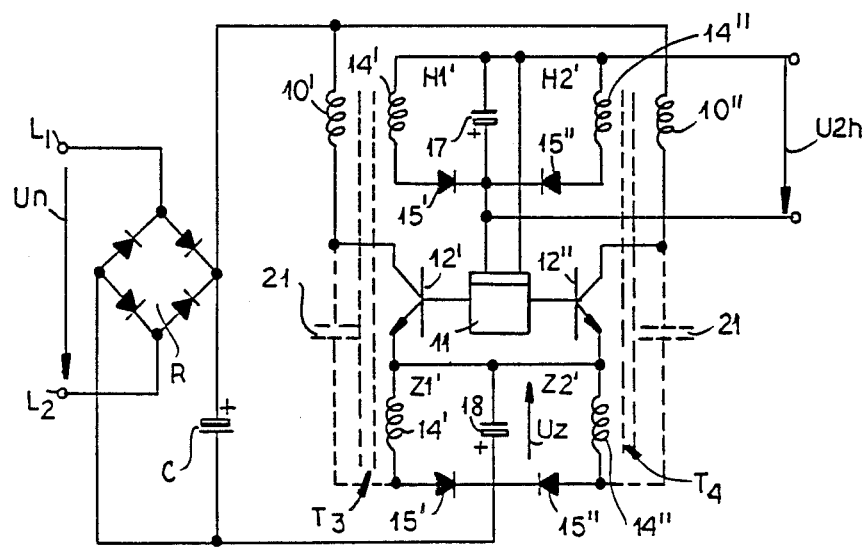
FIG. 4 shows the application of the invention to a circuit containing two single-end blocking converters operated in push-pull.

FIG. 4 shows a circuit which differs from that of FIG. 3 substantially only in the doubling of the elements to provide a push-pull effect In this embodiment, the line voltage is applied across terminals $L_1$ and $L_2$ and has been represented at Un. The rectifier bridge R has its output tapped across the capacitor C.

In this embodiment, two converter transformers $T_3$ and $T_4$ can be provided of identical construction.

The primary windings of these transformers have been shown at 10' and 10" to be connected in series with the respective diodes 12', 12" controlled by the pulse-width controller 11. The primary windings and emitter-collector networks of the respective transistors 12', 12", are connected in series with the secondary windings 14' and 14" of two rectifier circuits $Z_{1'}$ and $Z_{2'}$, connected in push-pull with the common condenser 18.

Each of these rectifier circuits collectively generating the additional voltage Uz, can include the respective rectifier diodes 15', 15".

In a substantially identical manner, the output voltage U2h is tapped across the condenser 17 to which, also in push-pull, two rectifier circuits $H_{1'}$ and $H_{2'}$ are connected. Each of these circuits also includes a secondary winding 14' or 14" of the respective transformer connected in series with a rectifier diode 15', 15".

Thus common load condensers 17 an 18 are here provided for the corresponding rectifier circuits $H_{1'}$, $H_{2'}$ and $Z_{1'}$, $Z_{2'}$ and both the main output voltage and the additional voltage are generated in push-pull with pulse-width control as has previously been described.

Figure 5:
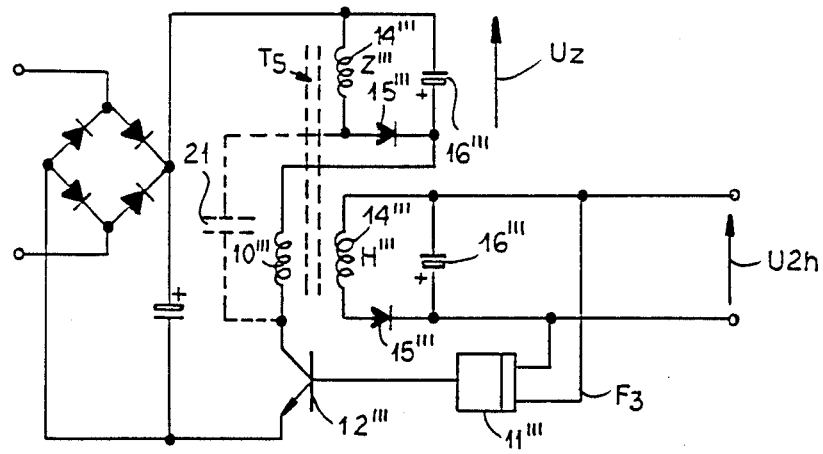
FIG. 5 is a circuit diagram of a single-end blocking converter representing a modification of the embodiment of FIG. 3.

The single-ended blocking converter of FIG. 5 differs from that of FIG. 3 in that the additional voltage Uz is generated by a rectifier circuit Z''' connected to an end of the primary winding 10''' of the transformer $T_5$ which is opposite the end to which the emitter-collector network of the transistor 12' is connected. In this embodiment, as well, the rectifier circuit Z' outputting the additional voltage Uz can include a secondary winding 14' and a rectifier diode 15''' connected across the load condenser 16'''.

The main voltage rectifier H''' has a similar construction with a secondary winding 14''', a rectifier diode 15''' and the load condenser 16''' to output the voltage U2h. The feedback loop $F_3$ is here applied to a pulse-width controller 11''' connected to the base of the transistor 12'''.

The dc converters in FIGS. 3–5, therefore comprise primary windings 10, 10', 10''', secondary windings 14, 14', 14''' for producing the additional voltages Uz which can have the same number of turns and can also include balancing condensers 21 connected in parallel with these windings so that the energy stored in the converter in the form of stray inductivity can be recovered cycle by cycle.

In all of the embodiments illustrated, the feed voltage Us can derive from a battery (e.g. the battery B in FIG. 3) rather than a line-voltage rectifier R.

I claim:

1. A direct-current converter for producing an output voltage from a feed voltage, comprising:
    a converter transformer having a primary winding and at least one secondary winding;
    a pulse-width control circuit connected in series with said primary winding;
    a main-voltage rectifier circuit connected with said secondary winding for outputting a main output voltage;
    means for controlling said pulse-width control circuit in response to said main output voltage;
    an additional-voltage rectifier circuit connected to output an additional voltage and generating said additional voltage by a rectification similar to that producing said main output voltage; and means for applying a feed voltage and said additional voltage additively to said primary winding.

2. The direct-current converter defined in claim 1 wherein said transformer has a further secondary winding connected to supply said additional-voltage rectifier.

3. The direct-current converter defined in claim 2 wherein the converter is a blocking converter.

4. The direct-current converter defined in claim 3 wherein each of said rectifier and pulse-width control circuits is a push-pull circuit.

5. The direct-current converter defined in claim 4 wherein the push-pull rectifier circuits each have a common load condenser for a pair of push-pull rectifiers.

6. The direct-current converter defined in claim 3 wherein said primary winding and said further secondary winding have the same number of turns, said pulse-width control circuit includes a transistor having an emitter-collector network connected to one end of said primary winding, and the other end of said primary winding is connected to an end of said further secondary winding to which a rectifier element of said additional-voltage rectifier circuit is connected.

7. The direct-current converter defined in claim 1 wherein each of said rectifier circuits includes a rectifier diode in series with a winding of said transformer, a choke in series with the respective rectifier diode, and a load condenser fed through the respective choke and across which a respective voltage is drawn.

8. The direct-current converter defined in claim 7 wherein said pulse-width control circuit includes a transistor having an emitter-collector network connected in series with said primary winding, and a pulse-width controller connected to a base of said transistor.

9. The direct-current converter defined in claim 8 wherein said feed voltage is generated by a battery applied across said primary winding and said emitter-collector network.

10. The direct-current converter defined in claim 8 wherein said feed voltage is generated by a rectifier connected to a source of line current and connected across said primary winding and said emitter-collector network.

11. The direct-current converter defined in claim 7 wherein each of said rectifier circuits includes a pair of secondary windings and respective rectifier elements connected in push-pull.

12. The direct-current converter defined in claim 7 wherein said primary winding is one of a pair of primary windings connected in push-pull.

13. The direct-current converter defined in claim 7 wherein said additional-voltage rectifier circuit is connected across said primary winding.

14. A direct-current converter for producing an output voltage from a feed voltage, comprising:

a converter transformer having a primary winding and at least one secondary winding;

a pulse-width control circuit connected in series with said primary winding;

a main-voltage rectifier circuit connected with said secondary winding for outputting a main output voltage;

means for controlling said pulse-width control circuit in response to said main output voltage;

an additional-voltage rectifier circuit connected to output an additional voltage and generating said additional voltage by a rectification similar to that producing said main output voltage; and means for applying a feed voltage and said additional voltage additively to said primary winding, said converter being a through-flow converter and said additional-voltage rectifier circuit being connected across said primary winding to rectify a voltage thereacross.

15. The direct-current converter defined in claim 14 wherein said rectifier circuits include magnetically coupled chokes.

16. The direct-current converter defined in claim 14 wherein said transformer has a further secondary winding connected to supply said additional-voltage rectifier.

17. The direct-current converter defined in claim 14 wherein each of said rectifier circuits includes a rectifier diode in series with a winding of said transformer, a choke in series with the respective rectifier diode, and a load condenser fed through the respective choke and across which a respective voltage is drawn.

18. The direct-current converter defined in claim 17 wherein said pulse-width control circuit includes a transistor having an emitter-collector network connected in series with said primary winding, and a pulse-width controller connected to a base of said transistor.

19. The direct-current converter defined in claim 18 wherein said feed voltage is generated by a battery applied across said primary winding and said emitter collector network.

20. The direct-current converter defined in claim 18 wherein said feed voltage is generated by a rectifier connected to a source of line current and connected across said primary winding and said emitter collector network.

21. The direct-current converter defined in claim 17 wherein each of said rectifier circuits includes a pair of secondary windings and respective rectifier elements connected in push-pull.

22. The direct-current converter defined in claim 17 wherein said primary winding is one of a pair of primary windings connected in push-pull.

23. The direct-current converter defined in claim 17 wherein said additional-voltage rectifier circuit is connected across said primary winding.

* * * * *